United States Patent
Hwang et al.

(10) Patent No.: US 9,025,763 B2
(45) Date of Patent: May 5, 2015

(54) APPARATUS AND METHOD FOR CANCELLING WIDEBAND ACOUSTIC ECHO

(71) Applicant: Electronics and Telecommunications Research Institute, Daejeon (KR)

(72) Inventors: In Ki Hwang, Daejeon (KR); Chang Choo, San Jose, CA (US)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/762,510

(22) Filed: Feb. 8, 2013

(65) Prior Publication Data

US 2013/0208884 A1      Aug. 15, 2013

(30) Foreign Application Priority Data

Feb. 9, 2012   (KR) .................. 10-2012-0013247

(51) Int. Cl.
    *H04M 9/08*    (2006.01)
    *H04M 3/00*    (2006.01)
    *H04B 3/20*    (2006.01)

(52) U.S. Cl.
    CPC  *H04M 3/002* (2013.01); *H04B 3/20* (2013.01)

(58) Field of Classification Search
    CPC ....... H04M 9/082; H04M 3/002; H04M 1/20; H04M 1/6033; H04M 9/085; H04R 3/02; G10L 2021/02082; G10L 21/0208; G10L 25/78; G10L 19/0204; G10L 25/18; H04B 3/23; H04B 3/20
    USPC ........ 379/406.01–406.16, 3; 381/71.1–71.14; 455/570

See application file for complete search history.

(56) References Cited

U.S. PATENT DOCUMENTS

| | | | |
|---|---|---|---|
| 6,570,985 B1 * | 5/2003 | Romesburg ............. | 379/406.08 |
| 6,608,897 B1 * | 8/2003 | Jin et al. .................. | 379/406.09 |
| 7,440,891 B1 * | 10/2008 | Shozakai et al. ............ | 704/233 |
| 8,170,224 B2 * | 5/2012 | Adeney et al. .................. | 381/66 |
| 2008/0159551 A1 * | 7/2008 | Harley et al. .................. | 381/66 |
| 2008/0189116 A1 * | 8/2008 | LeBlanc et al. ............... | 704/500 |
| 2010/0082335 A1 * | 4/2010 | Sung et al. .................... | 704/203 |
| 2012/0250882 A1 * | 10/2012 | Mohammad et al. ........ | 381/94.1 |

FOREIGN PATENT DOCUMENTS

KR       10-0524341       10/2005

* cited by examiner

*Primary Examiner* — Akelaw Teshale

(74) *Attorney, Agent, or Firm* — Nelson Mullins Riley & Scarborough LLP; Anthony A. Laurentano, Esq.; Lewis Lee, Esq.

(57) ABSTRACT

Disclosed is an apparatus and method for cancelling a wideband acoustic echo that controls a data flow of data that is transmitted and received using a central processing unit, and calculates data using a calculation processing unit configured to be distinct from the central processing unit.

18 Claims, 5 Drawing Sheets

FIG. 3

| Input | FET | C1_F(0) | C1_F(1) | ... | C1_F(N) | C2_F(0) | C2_F(1) | ... | C2_F(N) | | |
|---|---|---|---|---|---|---|---|---|---|---|---|
| | NET | C1_N(0) | C1_N(1) | ... | C1_N(N) | C2_N(0) | C2_N(1) | ... | C2_N(N) | | |
| Register | | | Channel_0 | | | | Channel_1 | | | | |
| DC_block_result | | | C1_F(0) | C1_F(1) | ... | C1_F(N) | C2_F(0) | C2_F(1) | ... | C2_F(N) | |
| | | | C1_N(0) | C1_N(1) | ... | C1_N(N) | C2_N(0) | C2_N(1) | ... | C2_N(N) | |
| Frame power result | | | | C1_F(0) | C1_F(1) | ... | C1_F(N) | C2_F(0) | C2_F(1) | ... | C2_F(N) |
| | | | | C1_N(0) | C1_N(1) | ... | C1_N(N) | C2_N(0) | C2_N(1) | ... | C2_N(N) |
| Noise power result | | | | C1_F(0) | C1_F(1) | ... | C1_F(N) | C2_F(0) | C2_F(1) | ... | C2_F(N) |
| | | | | C1_N(0) | C1_N(1) | ... | C1_N(N) | C2_N(0) | C2_N(1) | ... | C2_N(N) |

APPARATUS AND METHOD FOR CANCELLING WIDEBAND ACOUSTIC ECHO

CROSS-REFERENCE TO RELATED APPLICATION

This application claims the priority benefit of Korean Patent Application No. 10-2012-0013247, filed on Feb. 9, 2012, in the Korean Intellectual Property Office, the disclosure of which is incorporated herein by reference.

BACKGROUND

1. Field of the Invention

The present invention relates to a low power apparatus and method for cancelling a wideband acoustic echo, provided in multi-channel conference call equipment.

2. Description of the Related Art

An acoustic echo may refer to a voice signal that is output from a speaker on a terminal, to be input through a microphone in various paths and delivered to a Far-End Talker (FET), and an apparatus for cancelling an acoustic echo that is employed to cancel such an echo.

A method for cancelling an acoustic echo may include a variety of methods using space-time and space-frequency, and such methods have been improved to meet standards of time convergence to lower the acoustic echo below a predetermined level, a processing ability of a long echo path, double-talk detecting time, an amount of calculation, and the like.

However, a method for increasing an echo cancelling ability may require a significant increase in the amount of calculation required and a high efficiency central processing device, thereby increasing power consumption.

Further, in a case of conference call equipment that supports at least two channels rather than a conventional single channel, a real-time call is enabled by performing at least two inputs within a single time frame.

Such a performance may require the central processing device to be at least two times more efficient than the conventional single channel.

SUMMARY

According to an aspect of the present invention, there is provided an apparatus for cancelling a wideband acoustic echo, the apparatus including a central processing unit to control a data flow of data that is transmitted and received, and a calculation processing unit to process a data calculation, distinct from the central processing unit.

The central processing unit may include an operation determining unit to determine a data processing operation mode.

The calculation processing unit may include a de-correlation analyzing unit to perform a de-correlation analysis of data, a frame calculating unit to calculate energy of a Far-End Talker (FET) signal, a Near-End Talker (NET) signal, or an ERROR signal, a noise calculating unit to calculate energy of a noise signal, a first determining unit to determine a presence of the FET signal or the NET signal, a second determining unit to determine a simultaneous presence of the FET signal and the NET signal, a control unit to generate state information, a filtering unit to perform an adaptive filtering operation, and a post-processing unit to perform a post-processing of data.

The calculation processing unit may process data of multiple channels identically, absent interruption from the central processing unit through converting a memory.

The calculation processing unit may receive input data in which a data set of a first channel and a data set of a second channel are combined, and change a channel register value when a value of a counter that counts a number of pieces of the input data corresponds to a predetermined frame value.

A resulting value of the data calculation processing may be stored in a separate register for each channel.

The apparatus for cancelling the wideband acoustic echo may further include a register verifying unit to verify a register value used to determine whether an operation is an initial operation, and an initializing unit to initialize a system to a previous operation value when the operation is determined not to be an initial operation.

The apparatus for cancelling the wideband acoustic echo may further include a coefficient calculating unit to calculate a monitor coefficient value obtained by dividing an NET energy value by an ERROR energy value, a comparing unit to compare the monitor coefficient value and an initializing threshold value, and a first counter to increase an initializing counter value when the monitor coefficient value is greater than the initializing threshold value, wherein the first counter unit sets the initializing counter value to "0" when the monitor coefficient value is less than or equal to the initializing threshold value.

The initializing unit may initialize the system to an initial predetermined value when the initializing counter value is greater than a predetermined initializing value.

The apparatus for cancelling the wideband acoustic echo may further include a second counter to disable the initializing unit when a number of data samples received corresponds to a predetermined disable value.

The apparatus for cancelling the wideband acoustic echo may further include a determining unit to determine whether a monitor coefficient value obtained by dividing an NET energy value by an ERROR energy value corresponds to a normalized least mean square (NLMS) threshold value, a sampling unit to store a first echo environment threshold value of an off-line filter through a double data sampling when the monitor coefficient value corresponds to the NLMS threshold value, a predicting unit to predict a second echo environment coefficient value that is subsequent to the first echo environment coefficient value, a filter operation cycle changing unit to change an operation cycle of the off-line filter to a frame unit, and an ERROR energy value comparing unit to compare a first ERROR energy value based on the first echo environment coefficient value with a second ERROR energy value based on the second echo environment coefficient value, wherein the predicting unit re-predicts the second environment coefficient value when the second ERROR energy value is less than the first ERROR energy value.

According to an aspect of the present invention, there is provided a method for cancelling a wideband acoustic echo, the method including controlling a data flow of data that is transmitted and received using a central processing unit, and calculating data using a calculation processing unit that is configured to be distinct from the central processing unit.

The calculating of the data may include performing a de-correlation analysis of data, calculating energy of an Far-End Talker (FET) signal, a Near-End Talker (NET) signal, or an ERROR signal, calculating energy of a noise signal, determining a presence of the FET signal or the NET signal, determining a simultaneous presence of the FET signal and the NET signal, generating state information, performing an adaptive filtering operation, and performing a post-processing of data.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 is a diagram illustrating a data transition timeline according to an embodiment of the present invention;

DETAILED DESCRIPTION

Figure 1:
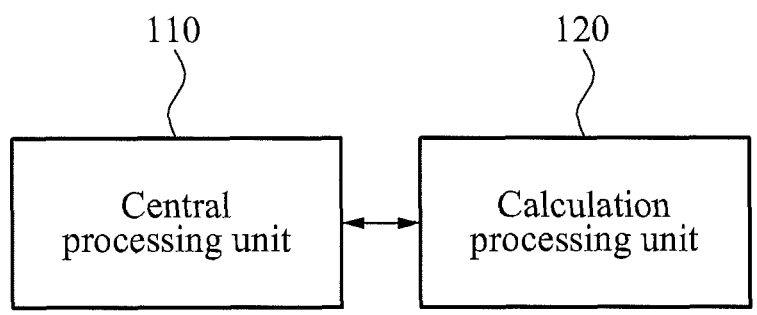
FIG. 1 is a block diagram illustrating a configuration of an apparatus for cancelling a wideband acoustic echo according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined that a detailed description related to a related known function or configuration which may make the purpose of the present invention unnecessarily ambiguous in the description of the present invention, such detailed description will be omitted. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a block diagram illustrating a configuration of an apparatus for cancelling a wideband acoustic echo according to an embodiment of the present invention.

Referring to FIG. 1, the apparatus for cancelling the wideband acoustic echo may include a central processing unit 110 to control a data flow of data that is transmitted and received, and a calculation processing unit 120 to process a data calculation, distinct from the central processing unit 110.

The apparatus for cancelling the wideband acoustic echo may perform a data flow controlling function in the central processing unit 110, and perform a data processing such as an arithmetic operation in the calculation processing unit 120 distinct from the central processing unit 110.

Figure 2:
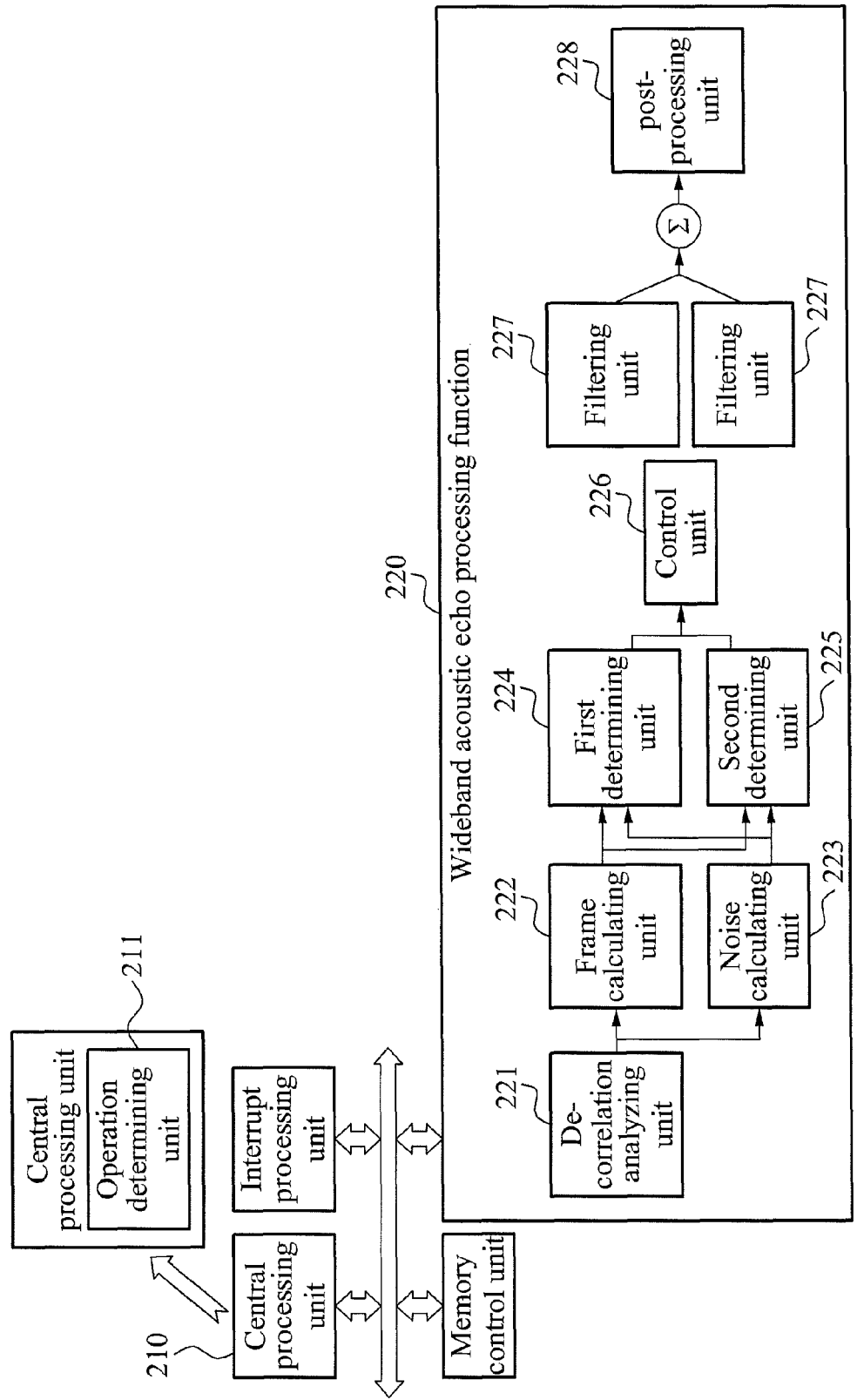
FIG. 2 is a block diagram illustrating a detailed configuration of an apparatus for cancelling a wideband acoustic echo according to an embodiment of the present invention.

FIG. 2 is a block diagram illustrating a detailed configuration of an apparatus for cancelling a wideband acoustic echo according to an embodiment of the present invention.

Referring to FIG. 2, a central processing unit 210 according to an embodiment of the present invention may determine a data processing operation mode, using an operation determining unit 211.

For example, the central processing unit 210 may process a State Machine function of determining an operation mode.

A calculation processing unit 220 according to an embodiment of the present invention may include a de-correlation analyzing unit 221 to perform a de-correlation analysis of data, a frame calculating unit 222 to calculate energy of a Far-End Talker (FET) signal, a Near-End-Talker (NET) signal, or an ERROR signal, a noise calculating unit 223 to calculate energy of a noise signal, a first determining unit 224 to determine whether the FET signal or the NET signal is present, a second determining unit 225 to determine whether the FET signal and the NET signal are present simultaneously, a control unit 226 to generate state information, a filtering unit 227 to perform an adaptive filtering operation, and a post-processing unit 228 to perform post-processing of data.

The de-correlation analyzing unit 221 according to an embodiment of the present invention may include a direct current (DC) block to perform a de-correlation of an input signal, and the frame calculating unit 222 may perform a Frame Power function of calculating the energy of the FET signal, the NET signal, and the ERROR signal.

The noise calculating unit 223 according to an embodiment of the present invention may perform a Noise Power function of calculating the energy of the noise signal.

The first determining unit 224 according to an embodiment of the present invention may perform a Voice Activity Detection (VAD) function of determining whether the FET signal or the NET signal is present, and the second determining unit 225 may perform a Double-Talk Detection (DTD) function of determining whether the FET signal and the NET signal are present simultaneously.

The control unit 226 according to an embodiment of the present invention may perform a Control Unit function of generating the state information, and the filtering unit 227 may perform a Fast Recursive Least Square (FRLS) function and a Normalized Least Mean Square (NLMS) function of performing the adaptive filtering operation.

The post-processing unit 228 according to an embodiment of the present invention may perform a Non-Linear Processing (NLP) function of performing a post-processing function.

The calculation processing unit 220 may process data of multiple channels identically, absent interruption from the central processing unit 210 through converting a memory.

The apparatus for cancelling the wideband acoustic echo may enhance a processing efficiency by processing a data arithmetic operation requiring a considerable amount of calculation simultaneously, and process the data of multiple channels by sharing an identical logic, absent the interrupt from the central processing unit 210 through converting a memory.

The calculation processing unit 220 may receive input data in which a data set of a first channel and a data set of a second channel are combined, and change a channel register value when a value of a counter that counts a number of pieces of the input data corresponds to a predetermined frame value.

The apparatus for cancelling the wideband acoustic echo may store a resulting value of the data calculation processing in a separate register for each channel A signal to be input may be input by combining a data set of channel 0 and a data set of channel 1, and when the value of the counter that counts the number of pieces of the input data reaches a frame value "N", the channel register value changes.

FIG. 3 is a diagram illustrating a data transition timeline according to an embodiment of the present invention.

Referring to FIG. 3, an apparatus for cancelling a wideband acoustic echo according to an embodiment of the present invention may process an arithmetic operation of data through a plurality of arithmetic operation blocks.

The apparatus for cancelling the wideband acoustic echo may perform the arithmetic operation of data through a pipeline structure such as the data transition according to timeline of FIG. 3, and a resulting value of the arithmetic operation may be stored in a separate register for each channel, through being adjusted according to a change of a channel register value.

Hereinafter, an apparatus for cancelling a wideband acoustic echo that provides a method for initializing a system will be described with reference to FIG. 4.

Figure 4:
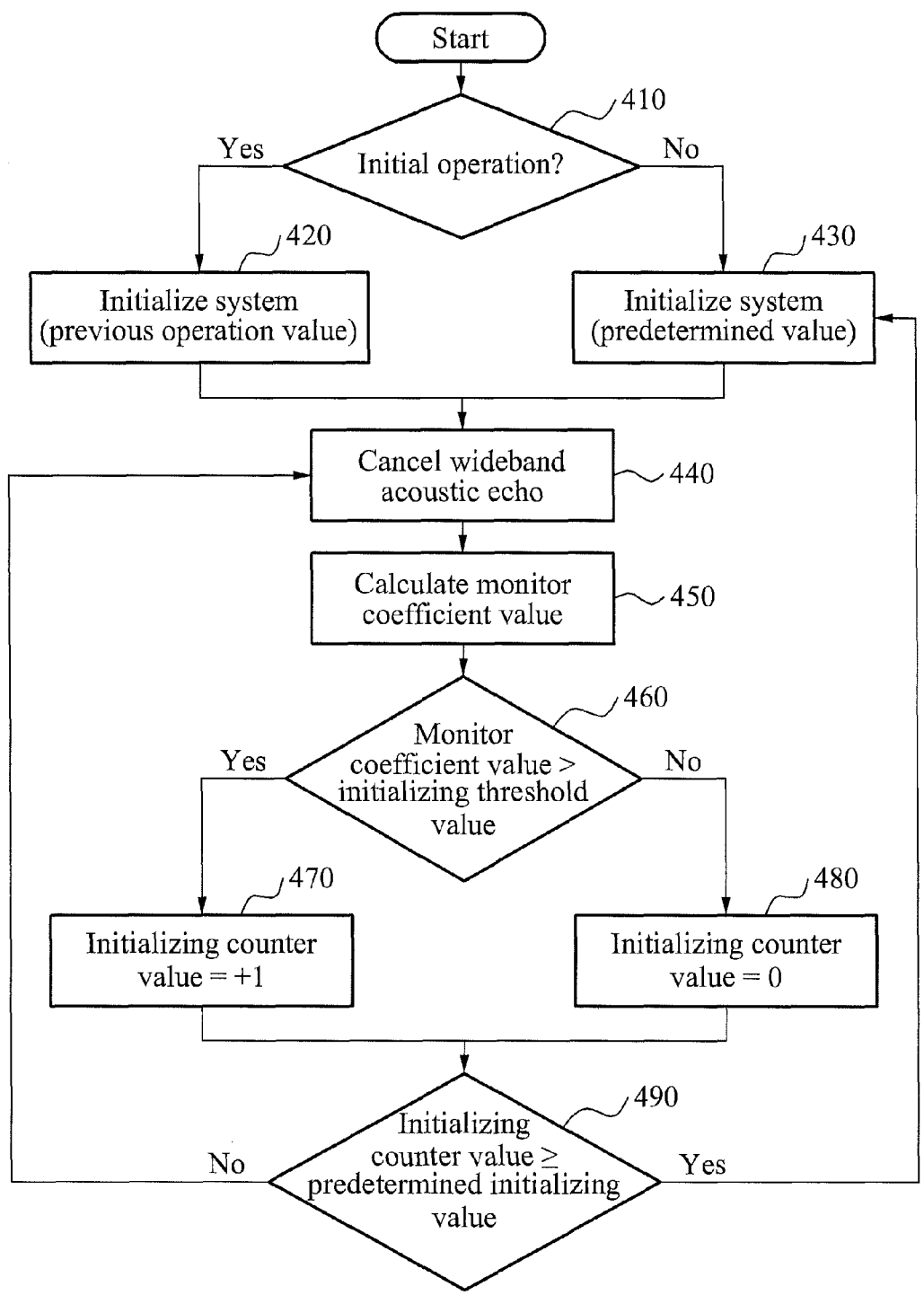
FIG. 4 is a flowchart illustrating a method for initializing a system according to an embodiment of the present invention.

FIG. 4 is a flowchart illustrating a method for initializing a system according to an embodiment of the present invention.

Referring to FIG. 4, in operation 410, an apparatus for cancelling a wideband acoustic echo according to an embodiment of the present invention may verify a register value used to determine whether an operation is an initial operation, using a register verifying unit. In operation 420, the apparatus for cancelling the wideband acoustic echo may initialize a system to a previous operation value, using an initializing unit when the operation is determined not to be an initial operation.

In operation 430, when the operation is determined to be an initial operation based on a result of the verification, the apparatus for cancelling the wideband acoustic echo may initialize the system to a predetermined value, using the initializing unit.

Here, in operation 440, the apparatus for cancelling the wideband acoustic echo may cancel a wideband acoustic echo.

In operation 450, the apparatus for cancelling the wideband acoustic echo may calculate a monitor coefficient value obtained by dividing an NET energy value by an ERROR energy value, using a coefficient calculating unit.

According to an embodiment of the present invention, since a conference call equipment is likely to operate at an identical location, provided that a previously obtained echo environment coefficient value is able to be stored for a subsequent operation, a ratio of the monitor coefficient value may be rapidly increased initially.

In operation 460, the apparatus for cancelling the wideband acoustic echo may compare the monitor coefficient value and an initializing threshold value, using a comparing unit.

In operation 470, the apparatus for cancelling the wideband acoustic echo may increase an initializing counter value, using a first counter when the monitor coefficient value is greater than the initializing coefficient value. In operation 480, the apparatus for cancelling the wideband acoustic echo may set the initializing counter value to "0" when the monitor coefficient value is less than or equal to the initializing threshold value.

For example, when the monitor coefficient value is unsatisfactory as anticipated, the apparatus for cancelling the wideband acoustic echo may increase the initializing counter value by "+1", and when the monitor coefficient value is satisfactory, the apparatus for cancelling the wideband acoustic echo may set the initializing counter value to "0".

In operation 430, the apparatus for cancelling the wideband acoustic echo may initialize the system to an initial predetermined value, using the initializing unit when the initializing counter value is greater than a predetermined initializing value.

For example, according to an embodiment of the present invention, when the initializing counter value is greater than "40" (40/16000=2.5 milliseconds (msec)), an occurrence of a change of environment is determined to be present, and an initialization to the initial predetermined value may be performed.

In operation 490, the apparatus for cancelling the wideband acoustic echo may disable the initializing unit, using a second counter when a number of data samples received corresponds to a predetermined disable value.

For example, according to an embodiment of the present invention, when a number of samples input by the second counter being distinct from the first counter reaches "800" (800/16000=50 msec), an initializing module may be disabled, and determined to be out of initialization.

Hereinafter, an apparatus for cancelling a wideband acoustic echo that provides a method for preventing performance degradation in a filtering operation and for reducing power consumption will be described with reference to FIG. 5.

Figure 5:
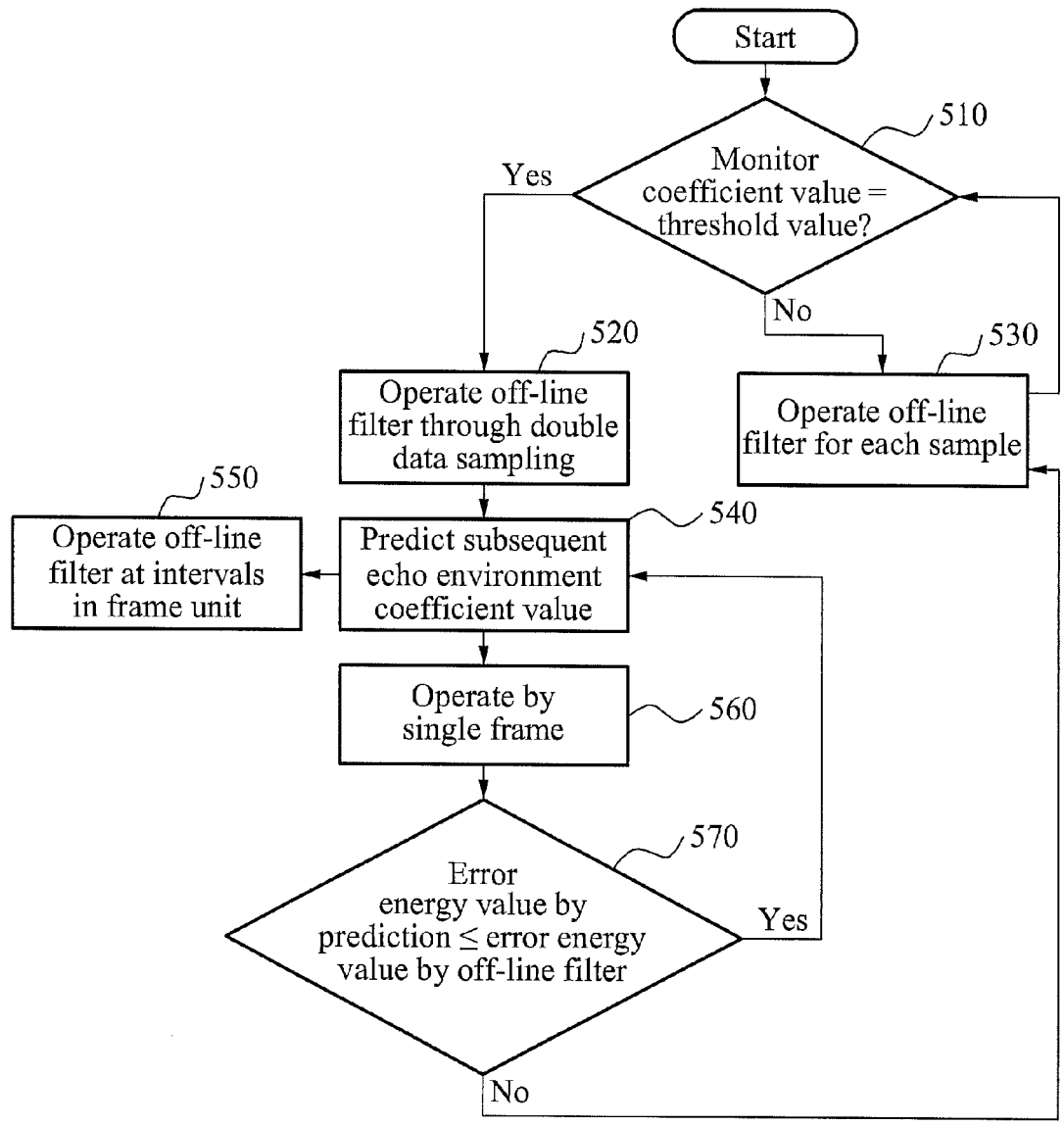
FIG. 5 is a flowchart illustrating a method for decreasing power consumption according to an embodiment of the present invention.

FIG. 5 is a flowchart illustrating a method for decreasing power consumption according to an embodiment of the present invention.

Referring to FIG. 5, in operation 510, the apparatus for cancelling the wideband acoustic echo may determine whether a monitor coefficient value obtained by dividing an NET energy value by an ERROR energy value corresponds to an NLMS threshold value.

In operation 520, the apparatus for cancelling the wideband acoustic echo may store a first echo environment coefficient value of an off-line filter through a double data sampling, using a sampling unit when the monitor coefficient value corresponds to the NLMS threshold value.

For example, when the monitor coefficient value reaches a predetermined NLMS threshold value, the apparatus for cancelling the wideband acoustic echo may store an off-line echo environment coefficient value in a memory through a double data sampling.

In operation 540, the apparatus for cancelling the wideband acoustic echo may predict a second echo environment coefficient value subsequent to the first echo environment coefficient value, using a predicting unit.

In operation 550, the apparatus for cancelling the wideband acoustic echo may change an operation cycle of the off-line filter to a frame unit, using a filter operation cycle changing unit.

The apparatus for cancelling the wideband acoustic echo may use a new echo environment coefficient value by predicting the new echo environment coefficient value, for example, $W(n+1)=W(n)+\alpha(W(n)-W(n-1))$, and change the operation cycle of the off-line filter from an existing sample unit to a frame unit in which the off-line filter is operated for each frame.

In operation 570, the apparatus for cancelling the wideband acoustic echo may compare a first ERROR energy value based on the first echo environment coefficient value and a second ERROR energy value based on the second echo environment coefficient value, using an ERROR energy value comparing unit.

In operation 540, the apparatus for cancelling the wideband acoustic echo may re-predict the second environment coefficient, using the predicting unit when the second ERROR energy value is less than the first ERROR energy value.

In operation 530, the apparatus for cancelling the wideband acoustic echo may control filter samples to operate for each filter sample, using the sampling unit when the second ERROR energy value is greater than the first ERROR energy value.

When the ERROR energy value obtained using an off-line filter coefficient value newly calculated is within a greater tolerance than a result obtained from the predicting unit, the apparatus for cancelling the wideband acoustic echo may obtain a reference value for a prediction, by operating the off-line filter through a double data sampling again.

According to embodiments of the present invention, it is possible to enhance a processing speed by embodying a repeated performance of an arithmetic operation of data with hardware, and by implementing a determining function of an operation state and an operation determination, in embodying an apparatus for cancelling a wideband acoustic echo.

According to an embodiment of the present invention, when an apparatus for cancelling a wideband acoustic echo is initialized, it is possible to improve an adaption speed in a current operation by using environment information obtained from a previous operation.

According to an embodiment of the present invention, it is possible to reduce power consumption by changing an environment coefficient value update performed for each sample to be performed for each frame unit in an NLMS operation, using an apparatus for predicting an environment coefficient value.

According to an embodiment of the present invention, it is possible to improve a performance of an apparatus for cancelling a wideband acoustic echo of a multi-channel conference call equipment, and reduce power consumption.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for cancelling a wideband acoustic echo, the apparatus comprising:
    a central processing unit to control a data flow of data that is transmitted and received; and
    a calculation processing unit to process a data calculation, distinct from the central processing unit,
    a determining unit to determine whether a monitor coefficient value obtained by dividing an NET energy value by an error energy value corresponds to a normalized least mean square (NLMS) threshold value;
    a sampling unit to store a first echo environment threshold value of an off-line filter through a double data sampling when the monitor coefficient value corresponds to the NLMS threshold value;
    a predicting unit to predict a second echo environment coefficient value that is subsequent to the first echo environment coefficient value;
    a filter operation cycle changing unit to change an operation cycle of the off-line filter to a frame unit; and
    an error energy value comparing unit to compare a first error energy value based on the first echo environment coefficient value with a second error energy value based on the second echo environment coefficient value,
    wherein the data calculation is for performing calculation on the data, separately from controlling flow of the data,
    wherein the predicting unit re-predicts the second environment coefficient value when the second error energy value is less than the first error energy value.

2. The apparatus of claim 1, wherein the central processing unit comprises:
    an operation determining unit to determine a data processing operation mode.

3. The apparatus of claim 1, wherein the calculation processing unit comprises:
    a de-correlation analyzing unit to perform a de-correlation analysis of data;
    a frame calculating unit to calculate energy of a Far-End Talker (FET) signal, a Near-End Talker(NET) signal, or an error signal;
    a noise calculating unit to calculate energy of a noise signal;
    a first determining unit to determine a presence of the FET signal or the NET signal;
    a second determining unit to determine a simultaneous presence of the FET signal and the NET signal;
    a control unit to generate state information;
    a filtering unit to perform an adaptive filtering operation; and
    a post-processing unit to perform a post-processing of data.

4. The apparatus of claim 1, wherein the calculation processing unit processes data of multiple channels identically, absent interruption from the central processing unit through converting a memory.

5. The apparatus of claim 1, wherein the calculation processing unit receives input data in which a data set of a first channel and a data set of a second channel are combined, and changes a channel register value when a value of a counter that counts a number of pieces of the input data corresponds to a predetermined frame value.

6. The apparatus of claim 1, wherein a resulting value of the data calculation processing is stored in a separate register for each channel.

7. The apparatus of claim 1, further comprising:
    a register verifying unit to verify a register value used to determine whether an operation is an initial operation; and
    an initializing unit to initialize a system to a previous operation value when the operation is determined not to be an initial operation.

8. The apparatus of claim 7, further comprising:
    a coefficient calculating unit to calculate a monitor coefficient value obtained by dividing an NET energy value by an error energy value;
    a comparing unit to compare the monitor coefficient value and an initializing threshold value; and
    a first counter to increase an initializing counter value when the monitor coefficient value is greater than the initializing threshold value,
    wherein the first counter unit sets the initializing counter value to "0" when the monitor coefficient value is less than or equal to the initializing threshold value.

9. The apparatus of claim 8, wherein the initializing unit initializes the system to an initial predetermined value when the initializing counter value is greater than a predetermined initializing value.

10. The apparatus of claim 8, further comprising:
a second counter to disable the initializing unit when a number of data samples received corresponds to a predetermined disable value.

11. A method for cancelling a wideband acoustic echo, the method comprising:
controlling a data flow of data that is transmitted and received using a central processing unit; and
calculating data using a calculation processing unit that is configured to be distinct from the central processing unit,
determining whether a monitor coefficient value obtained by dividing an NET energy value by an error energy value corresponds to a normalized least mean square (NLMS) threshold value;
storing a first echo environment coefficient value of an off-line filter through a double data sampling when the monitor coefficient value corresponds to the NLMS threshold value;
predicting a second echo environment coefficient value that is subsequent to the first echo environment coefficient value;
changing an operation cycle of the off-line filter to a frame unit;
comparing a first error energy value based on the first echo environment coefficient value and a second error energy value based on the second echo environment coefficient value; and
re-predicting the second environment coefficient value when the second error energy value is less than the first error energy value,
where the calculating data is for performing calculation on the data, separately from controlling flow of the data.

12. The method of claim 11, wherein the calculating of the data comprises:
performing a de-correlation analysis of data;
calculating energy of an Far-End Talker (FET) signal, a Near-End Talker (NET) signal, or an error signal;
calculating energy of a noise signal;
determining a presence of the FET signal or the NET signal;
determining a simultaneous presence of the FET signal and the NET signal;
generating state information;
performing an adaptive filtering operation; and
performing a post-processing of data.

13. The method of claim 11, wherein the calculating of the data comprises:
processing data of multiple channels identically absent interruption from the central processing unit through converting a memory.

14. The method of claim 11, further comprising:
storing a resulting value of the data calculation processing in a separate register for each channel.

15. The method of claim 11, further comprising:
verifying a register value used to determine whether an operation is an initial operation; and
initializing a system to a previous operation value when the operation is determined not to be an initial operation.

16. The method of claim 15, further comprising:
calculating a monitor coefficient value obtained by dividing an NET energy value by an error energy value;
comparing the monitor coefficient value and an initializing threshold value;
increasing an initializing counter value when the monitor coefficient value is greater than the initializing threshold value; and
setting the initializing counter value to "0" when the monitor coefficient value is less than or equal to the initializing threshold value.

17. The method of claim 16, further comprising:
initializing the system to an initial predetermined value when the initializing counter value is greater than a predetermined initializing value.

18. The method of claim 16, further comprising:
disabling the initializing unit when a number of data samples received corresponds to a predetermined disable value.

* * * * *